Figure 1:
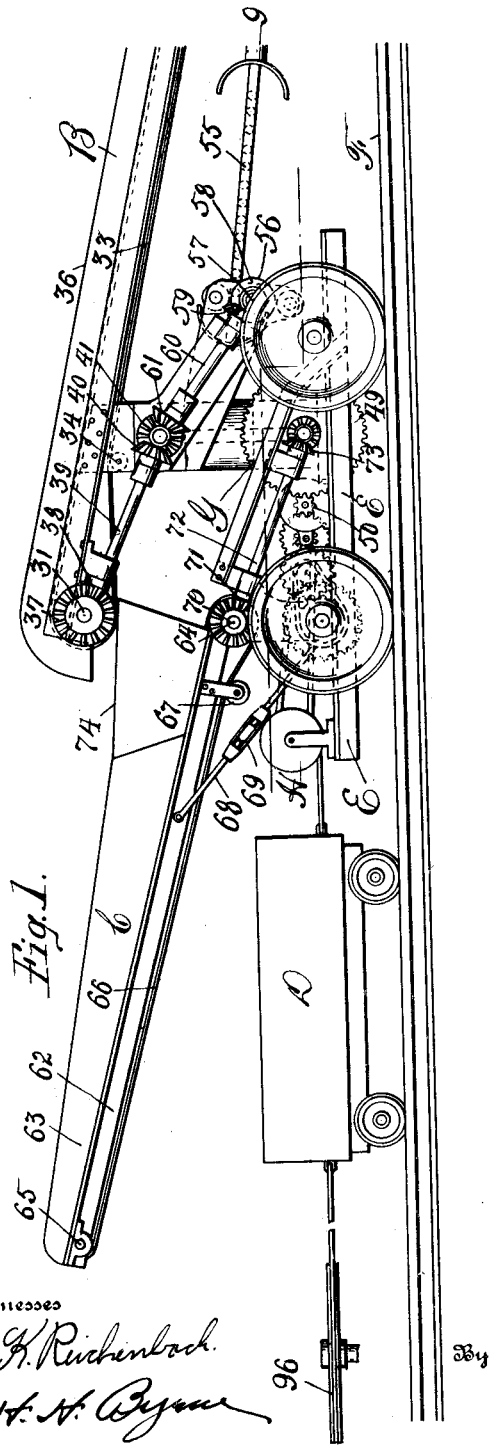
Figure 1B:
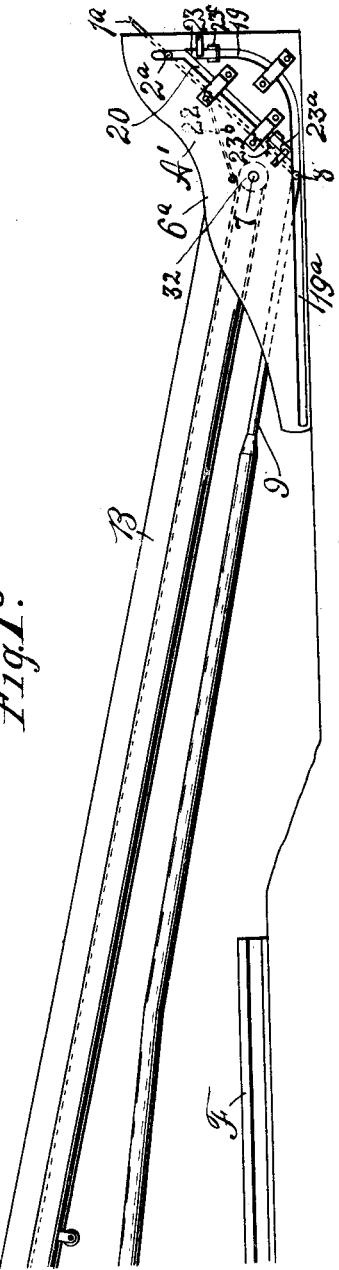

R. O. COUCH.
LOADING MACHINE.
APPLICATION FILED JUNE 23, 1909.

1,057,122.

Patented Mar. 25, 1913.
5 SHEETS—SHEET 1.

Witnesses

Inventor,
Royden O. Couch,
Knight Bros
Attorneys.

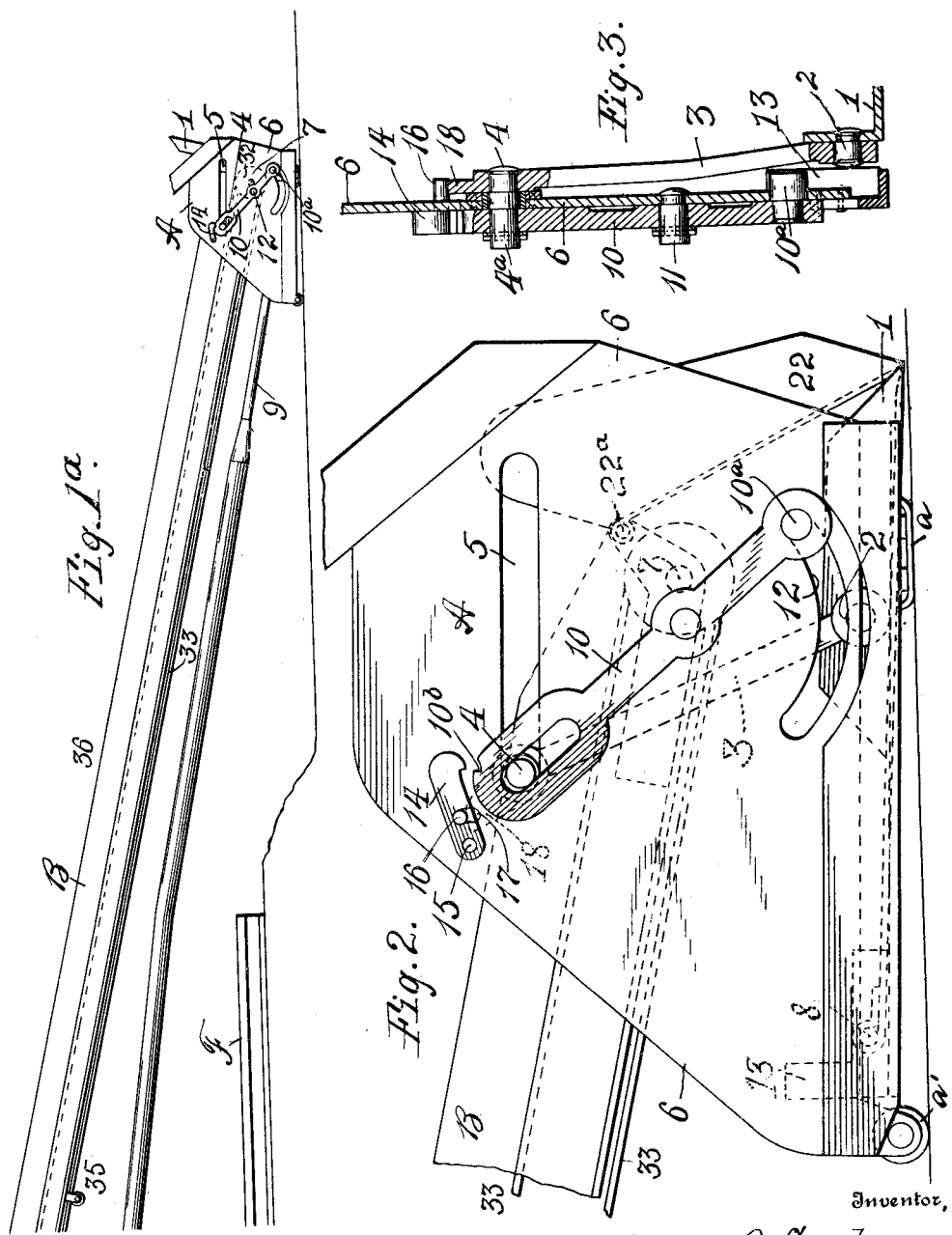

R. O. COUCH.
LOADING MACHINE.
APPLICATION FILED JUNE 23, 1909.

1,057,122.

Patented Mar. 25, 1913.
5 SHEETS—SHEET 4.

WITNESSES
C. K. Reichenbach
H. N. Byrne

INVENTOR
Royden O. Couch,
By Knight Bros.
Attorney

R. O. COUCH.
LOADING MACHINE.
APPLICATION FILED JUNE 23, 1909.

1,057,122.

Patented Mar. 25, 1913.
5 SHEETS—SHEET 5.

Witnesses

Inventor:
Royden O. Couch,
By Knight Bros,
Attorneys

UNITED STATES PATENT OFFICE.

ROYDEN O. COUCH, OF CHARLESTON, WEST VIRGINIA, ASSIGNOR OF ONE-THIRD TO CHARLES A. CABELL, OF CARBON, WEST VIRGINIA, AND ONE-THIRD TO GUY A. WILLEY, OF CHARLESTON, WEST VIRGINIA.

LOADING-MACHINE.

1,057,122.      Specification of Letters Patent.      Patented Mar. 25, 1913.

Application filed June 23, 1909. Serial No. 503,952.

*To all whom it may concern:*

Be it known that I, ROYDEN O. COUCH, a citizen of the United States, and a resident of Charleston, in the county of Kanawha and State of West Virginia, have invented a certain new and useful Loading-Machine, of which the following is a specification.

My invention relates to a machine for transferring loose materials from a place of deposit.

While applicable for use in handling any material in broken up or divided form, the machine herein illustrated for the purpose of disclosing the nature of the invention, is designed more particularly for handling coal and delivering it to a car or other vehicle in which it is to be transported.

Inasmuch as the market value of coal is directly influenced by excessive disintegration, it is the purpose of my invention to pick up successive charges of coal in continuous operation, by a method which will reduce breaking to a minimum, and deposit said coal upon a conveyer belt by which it will be removed to the point where it is to be discharged or delivered to another conveyer belt for transfer to the point of discharge.

One feature of my present invention, therefor, consists in providing a shovel with automatic means for imparting to it movements which will introduce it beneath a quantity of material and then raise it in a manner closely simulating the movement of a shovel when manipulated by hand. It is also desirable in attacking a pile of broken down material or mineral to be able to move the shovel across the front of the pile so as to attack different portions thereof successively while delivering the material thus gathered, at a common point of discharge.

Another feature of my invention, therefore, consists in having two conveyers, one of which I call a gathering or feeding conveyer which receives the material from the shovel, and a delivery conveyer which receives material from the gathering conveyer and transfers it to the point of discharge; the first named conveyer being mounted with freedom of movement about a vertical axis adjacent to its point of discharge on to the delivery conveyer and the latter being provided with a hopper through which it receives material from the gathering conveyer at any angle of the gathering conveyer; the delivery conveyer being also adjustable vertically to adapt it to discharge with the least necessary fall, into different heights of vehicles or receptacles for the material.

In a machine of this kind it is very desirable to provide for auto-locomotion both for transportation and for gradual advance of the machine toward the pile of material being attacked so as to maintain the shovel in effective relation to the material at all times.

Another feature of my invention, therefore, consists in mounting the machine on wheels, preferably adapted to a track, and providing it with a suitable prime mover through which it may receive either of two movements, to wit, the relatively slow and gradual feeding movement which keeps the shovel in position to attack the pile of material, and a relatively fast transport movement by which the machine may be moved from place to place; these two movements being preferably attained from a common source of power through different gearing.

As a machine of this type finds one of its principal fields of usefulness in loading coal on cars in the mine, and such operations are generally carried on at points more or less removed from main lines of trackage, it is desirable to have convenient means for transferring mine cars from the main line of trackage to the location of the machine in front of the breast of coal.

A feature of my invention, therefore, consists in combining with the prime mover a cable traction means by which mine cars may be drawn to and from the machine, and a clutch mechanism by which the cable traction means may be thrown into or out of operation at will.

Other features of my invention consist in the particular construction, arrangement and combination of parts whereby I am enabled to accomplish the objects of my invention in an economical manner and whereby the machine is adapted to withstand the conditions under which it must operate in practice.

Figure 4:
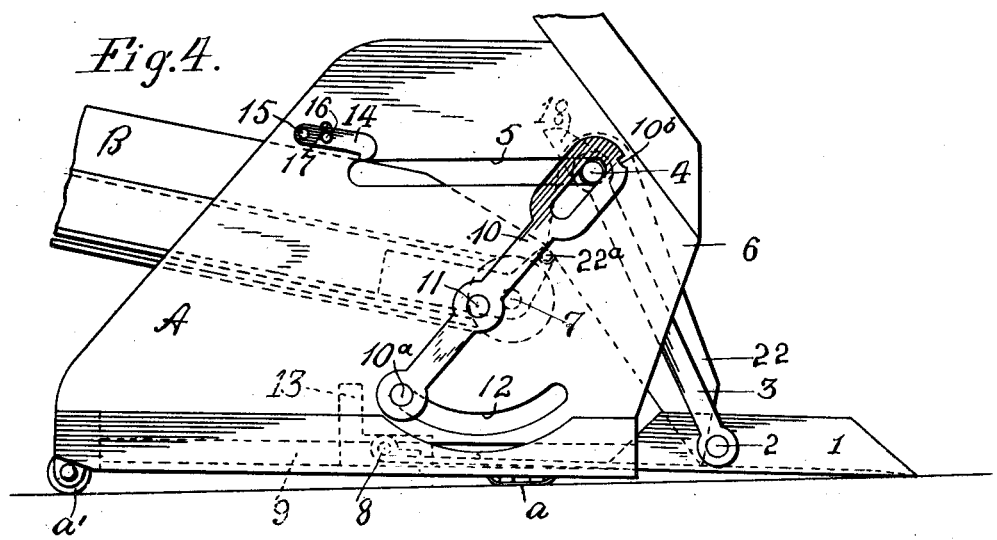
Figure 5:
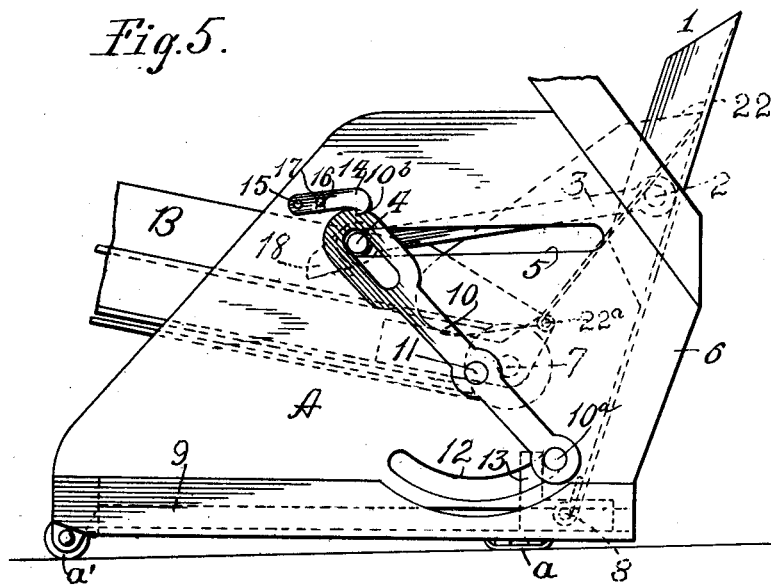
Figure 6:
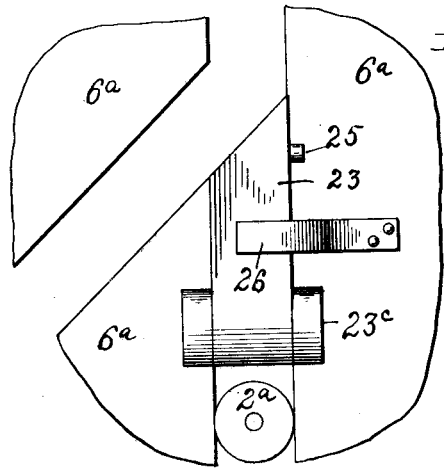
Figure 7:
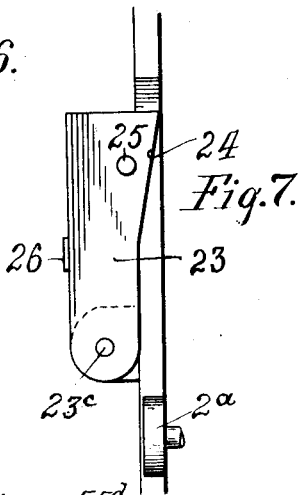
Figure 8:
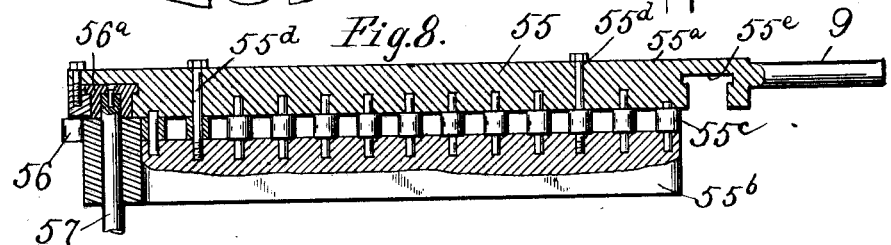
Figure 9:
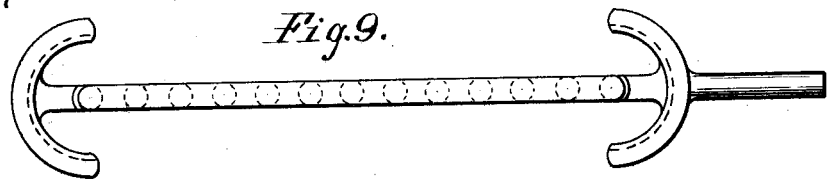
Figure 10:
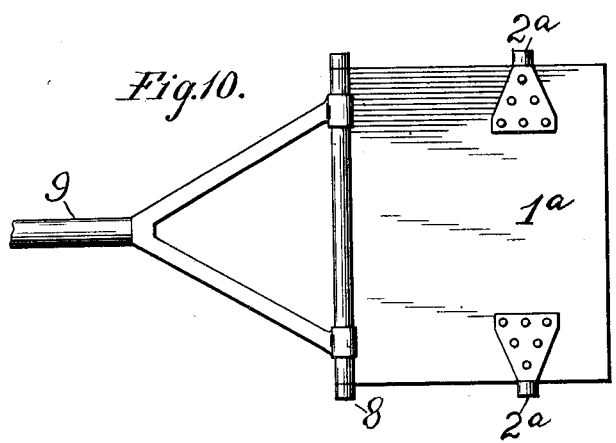
Figure 11:
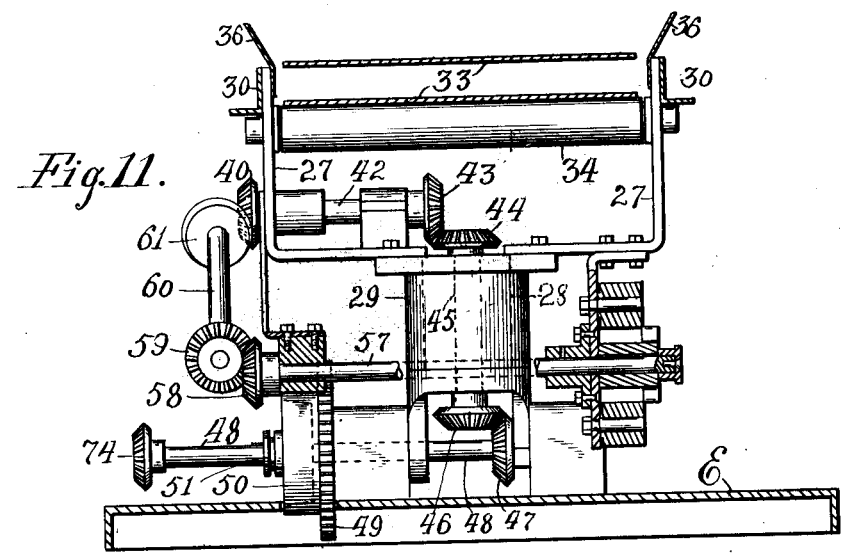
Figure 12:
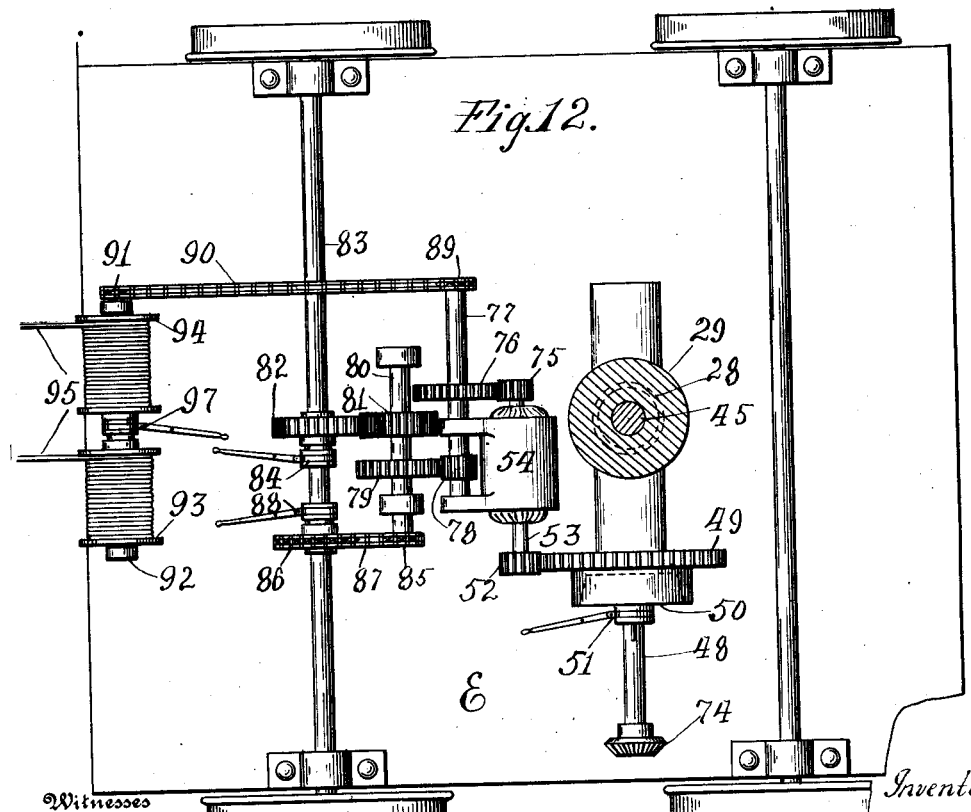

My invention will be fully understood upon reference to the accompanying drawings, in which, Figures 1 and 1ᵃ together represent a side elevation of a machine embodying the several features of my present invention. Fig. 1ᵇ is a view corresponding to Fig. 1ᵃ showing a modified construction of the shovel and the parts which define its movement. Fig. 2 is a side view on an enlarged scale of the form of shovel controlling means illustrated in Fig. 1ᵃ, the parts being in the positions which they assume before the shovel begins to move forward beneath the pile of material. Fig. 3 is a vertical transverse section on the line 3—3 Fig. 2, with the conveyer and other parts omitted. Figs. 4 and 5 are views corresponding to Fig. 2, with the shovel controlling means in two positions succeeding that illustrated in Fig. 2, to wit, when it is at its forward limit beneath the material and when it is in elevated position to dump the material. Figs. 6 and 7 are detail views in side elevation and vertical transverse section of the switch employed for determining the return movement of the shovel in the form of controlling means illustrated in Fig. 1ᵇ. Figs. 8 and 9 are detail views showing by horizontal section and side elevation the construction of the means for imparting a relatively slow reciprocating movement to the thrust bar which actuates the shovel. Fig. 10 is a detail view of the form of shovel employed in Fig. 1ᵇ. Figs. 11 and 12 show by front elevation and plan view the means through which power is supplied to the various operating parts of the machine, some of the parts in Fig. 11 being in section on the line 11—11 Fig. 1, and Fig. 12 showing the parts omitted which occur above the plane of the line 12—12, Fig. 1.

As will be seen upon reference to the drawings, the machine embodies a shovel section A, a gathering conveyer B, a delivery conveyer C, adapted to discharge into a car or other receptacle D, a suitable mounting E, preferably in the form of a wheeled platform or truck adapted to run upon a track F, a suitable prime mover G with driving connections and a cable traction means H.

Referring to Figs. 1ᵃ, 2, 3, 4 and 5, it will be seen that one embodiment of the shovel section A, comprises a shovel 1 which is pivotally mounted at 2 in a pair of links 3 which are in turn supported on pintles 4 that are adapted to slide in slots 5 in the cheek-plates 6 of said shovel section A of the machine. The shovel section is pivoted at 7 to the section B, as hereinafter explained, whereby it is adapted to rest upon the surface in front of the pile to be attacked, shoes or runners a and rollers a' being provided, if desired, to support the same. The shovel 1 is connected at 8 with a thrust bar 9 that receives, hereinafter described, a relatively slow reciprocation in the direction in which the shovel moves beneath the pile of material. As the shovel moves forward under the thrust of the bar 9, the pin 4 follows such movement in the slot 5, until the shovel reaches the position shown in Fig. 4 at which time a lever 10, fulcrumed at 11 and carrying a stud 10ᵃ projecting through slot 12, will be engaged by a shoulder 13 on the shovel 1, and thrown so that while its lower end moves forward, its upper end that engages a projection 4ᵃ on the pintle 4, will move rearward, and carry the pintle 4 with the result that the shovel 1 is lifted to the position shown in Fig. 5 and its contents will be discharged rearward. On the return movement of the thrust bar 9, which draws in the rear end of the shovel, the pintle 4 cannot move forward owing to its engagement by a dog 14 pivoted at 15 and entering a notch 10ᵇ in the lever 10; hence the return movement of the shovel will be in an arcuate path quite distinct from its outward and upward movement and there will be no interference with the pile of material being attacked. However, as soon as the parts resume the position shown in Fig. 2, a pin 16 projecting from dog 14 through a slot 17, is engaged by a horn 18 on the supporting link 3 and the dog is thereby lifted out of engagement with the notch 10ᵇ so that the pintle 4 is free to move forward on the next thrust of the shovel beneath the pile of material.

From the foregoing description, it will be understood that the shovel moves directly beneath the material on its outward stroke and thereby engages with an amount determined by the capacity of the shovel, after which by a continued forward and upward movement it assumes a dumping position; and after dumping the shovel returns in a much shorter arc to a position to renew the attack on the pile without having dragged or impinged the surface of the pile being attacked. In order that the material discharged rearwardly from the shovel may reach the gathering conveyer, a chute 22 pivoted at 22ᵃ in delivery relation to the conveyer, rests normally upon the shovel and is moved by the shovel from the position shown in Fig. 4, when the shovel receives its load, to the position shown in Fig. 5 when the shovel will transfer its contents to the chute and the latter will deliver it to the conveyer. The chute as well as the shovel contains side walls to confine the material laterally.

The supporting links constitute guides for defining the movement of the shovel and by the shifting of the pintles of the links, the forward end of the shovel is made to move upward but its arcuate path is so defined that it assumes a rearwardly dumping angle. But I desire it understood that I do not limit myself to the means thus far described for defining the path of the shovel as it will be seen upon reference to Fig. 1ᵇ, that a shovel such as 1ª having trunnions 2ª may be mounted to slide in slots 19 and 19ª in the cheek-plate 6ª, which slots thus constitute guides and are so designed that the shovel will first move outward and be thrust beneath the pile and its forward end will then move upward into a position which establishes an effective rearward dumping angle. It will also be observed that the means for shifting the pintles 4 so that the guides can force the return of the shovel through a different path, find their equivalent to a large extent in the return slots 20 in the cheek-plates 6ª (Fig. 1ᵇ) while the means for shifting the shovel from one path to the other supplied by the levers 10, are replaced by switches 23 and 23ª at the intersection of the guide slots 19—20 and 19ª; these switches being pivoted at 23ᵇ, 23ᶜ, and provided with inclined deflecting faces 24 and with limiting pins 25 and springs 26 by means of which they are held in position to engage the trunnions 2ª and direct the latter into the proper slot.

The gathering conveyer B comprises a supporting yoke 27 supported by a vertical trunnion 28 in a standard 29, and side arms 30 mounted upon said yoke and constructed with an upper transverse drive roll 31 and a lower guide roll 32 for an endless apron 33. Said apron is further supported by a deflecting roll 34 and any suitable number of intermediate rolls 35. The frame of the conveyer is preferably provided with side plates 36.

Movement is imparted to the endless belt or apron 33, by means of a beveled gear 37 on the shaft 31 driven by a toothed cone 38 on a shaft 39 which meshes through gear wheel 40 with a gear 41 on the outer ends of the transverse shaft 42 which carries on its inner end a gear 43 meshing with gear 44 on the upper end of the vertical shaft 45 that is concentric with the trunnion 28 and carries at its lower end a gear 46 meshing with gear 47 on transverse shaft 48. The shaft 48 is driven by a large gear wheel 49 that is loose on the shaft 48 but adapted to be thrown into driving connection therewith through the medium of a clutch 50 controlled by a hand lever 51 (Figs. 11 and 12). The gear wheel 49 is driven by the relatively small pinion 52 on the shaft 53 of motor 54.

To impart constant relatively slow reciprocation to the thrust bar 9 which operates the shovel, said bar carries upon its upper end a specially constructed rack 55 that meshes with an appropriately formed pinion 56 as hereinafter more fully explained, which pinion 56 is mounted upon a shaft 57 that carries a gear wheel 58 (Fig. 11) meshing with a gear 59 on shaft 60 which carries at its opposite end a gear 61 meshing with the gear 40 whose driving connections with the motor have already been explained.

To keep the rack in constant engagement with pinion 56, during the longitudinal movements of the rack, confining rollers 56ˣ, 56ʸ are spaced respectively above and below the pinion, a distance suitable to admit the rack between them and the pinion, and preferably in position to bear against one of the side bars (55ᵇ) of the rack; and for the sake of smooth working and durability, the opposing support of the rack by the pinion, is afforded not by the rack resting between the pinion teeth, but through the opposite side of the same bar 55ᵇ, riding upon a cylindrical extension 56ʷ, of the pinion (see Fig. 8).

By means of that portion of the driving gear thus far described, it will be seen that constant travel is imparted to the gathering belt or apron while the shovel continually receives movements which force it beneath the pile of material and then elevate it to a position to dump upon the belt or apron. The relative speeds of these parts is determined so that the apron will take care of all the material deposited upon it. It will also be seen that these driving connections are maintained regardless of lateral adjustment of the gathering end of the conveyer B.

As will be understood from Figs. 8 and 9, the rack 55 comprises a pair of parallel bars 55ª, 55ᵇ with interposed roller pins 55ᶜ some of which may have their pintles elongated to provide connecting bolts 55ᵈ; these roller pins being adapted to mesh with the teeth on the pinion 56 so that as said pinion revolves, the rack will be made to travel in the plane of its longitudinal dimension. In order to insure continued engagement of the pinion 56 with the rack at the limits of its longitudinal movement, and reversal of the rack's movement as the pinion reaches either end, said rack is further constructed with arcuate end guides 55ᵉ that receive guide roll 56ª mounted coaxially with the shaft 57 of the pinion 56. The guides 55ᵉ being concentric with the end pins 55ᶜ, it follows that when the pinion reaches an end pin, and longitudinal movement of the rack is arrested by the guide 55ᵉ, pinion 56 continues in engagement with the said pin, as the roller 56ª travels in the guide 55ᵉ, and the pinion shifts its relation from one side of the rack to the other. Inasmuch as the driving shaft 57 of the pinion is mounted in fixed bearings, this results in shifting the rack from a plane tangent to the upper side of the pinion, to a plane tangent to the lower side of the pinion.

The delivery conveyer C is constructed with a frame 62 with side walls 63, a lower drive roll 64 mounted upon a horizontal axis about which the frame 62 is mounted to swing, and an upper guide roll 65. This apron 66 travels from the rolls 64 and 65 and is supported intermediately by any suitable number of idlers 67. A strut or compression member 68 extending from the frames 62 to a fixed part of the machine, and provided with means, such as a turn buckle 69, for changing its length, adapts the conveyer C to be adjusted to change the height of its delivery end 65.

To rotate the drive roll 64, it is provided with a pinion 70 that meshes with a pinion 71 on shaft 72 which is geared at 73 to a pinion 74 on the shaft 48 which we have already seen, is thrown into and out of connection at will with the motor driven wheel 49. Inasmuch as clutch 50 determines the travel of both the aprons 33 and 66, it follows that material gathered by the apron 33 will be discharged by the apron 66 as fast as it is lifted. To receive material gathered by the apron 33, the conveyer C is provided with a hopper 74 of such dimensions that it will receive material lifted by the apron 33 at whatever angle the conveyer B may be adjusted to.

To transfer the machine, both for feeding the shovel into the material and for shifting from place to place, the motor 54 is designed to impart rotation to one pair of the wheels upon which the truck E is mounted at either of two speeds, appropriate to the two functions to be performed. For these purposes, motor shaft 53 carries a pinion 75 meshing with a larger gear 76 on a shaft 77 which carries a small gear 78 that meshes with a large gear 79 on a shaft 80. Rotation is thus constantly imparted to shaft 80 at a much lower speed than that of the armature shaft. For transferring the machine, shaft 80 is connected through a reduction gear 81, 82 with the axle 83, the gear 82 being loose upon said axle and adapted to be thrown into and out of driving connection therewith through means of a clutch 84. The direction in which the machine will be transferred by the connections just described will be determined by the direction in which the current is sent through the motor armature.

To feed the machine slowly and gradually for keeping the shovel within reach of the pile of material, an independent driving connection is provided between shaft 80 and the axle 83, consisting of a sprocket 85 on shaft 80, a sprocket 86 on axle 83 and sprocket chain 87 connecting the same. The sprocket wheel 86 is loose upon the axle 83, but may be thrust into and out of driving connection therewith through a clutch 88.

The motor 54 is further employed for the purpose of transferring cars or other receptacles which the machine is adapted to load, to and from the loading position. For this purpose shaft 77 is further provided with a sprocket 89 connected by a sprocket chain 90 with the sprocket 91 on a shaft 92 upon which are loosely mounted two winding drums 93, 94 that receive the opposite ends of a cable 95 that is guided at a distant point around an idler 96. By locating the idler at or near an opening adjacent to the permanent mine trackage, cars may be shunted from the main track and connected to the cable at such point and then by throwing a clutch 97 into engagement with the appropriate drum 93 or 94, the car may be hauled through the medium of the cable up to the dumping point of the machine. After the car is filled it may be connected with the opposite portion of the cable and the clutch 97 shifted to drive the cable in the opposite direction when the car will be returned to the main track. By retaining one of the clutch connections with the winding drums, and releasing the other drum, the machine may feed forward as the shovel operates and thus retain the car in loading position, the loose drum yielding to pay out cable as the car feeds along.

Having thus described my invention what I claim as new therein and desire to secure by Letters Patent is:—

1. In a loading device, a shovel, single forwardly and backwardly reciprocating means actuating the shovel in its reciprocating and tilting movements, front and rear supporting bearings for said shovel, and guides for said bearings coöperating in defining the paths through which said shovel moves, the front supporting bearing traversing a path leading first forward to penetrate the mass, then upward and rearward to lift the portion of the mass engaged and to throw the lifted portion of the mass in the rearward direction, and lastly an arcuate return movement to the starting position, the reciprocating means being attached at the rear supporting bearing, whereby said rear bearing receives a rectilinear feed stroke and a similar return stroke.

2. In a loading device, a shovel, front and rear supporting bearings for said shovel and guides for said bearings coöperating in defining the paths through which said shovel moves, the front supporting bearing traversing a path leading first forward to penetrate the mass, then upward and rearward to lift the portion of the mass engaged and to throw the lifted portion of the mass in the rearward direction, driving means for imparting the entire cycle of movements to the shovel applied thereto at the point of the rear supporting bearing, said driving means having a straight, reciprocating movement.

3. In a loading device, a shovel, front and rear supporting bearings for said shovel and guides for said bearings, single forwardly and backwardly reciprocating means actuating the shovel in its reciprocating and tilting movements, said reciprocating means being connected at the point of the rear supporting bearing, said bearings and guides constructed to define a path for the front bearing of said shovel first forward to penetrate the mass, and then upward and rearward to lift the portion of the mass engaged, and to throw the lifted portion of the mass in the rearward direction.

4. In a loading device, the combination of a shovel, means having a straight, reciprocating action for imparting a thrust to the shovel, a pair of links pivotally mounted and adapted to support the shovel forming forward bearings, a pair of levers pivoted to the respective link pintles at their upward extremities and at their lower end provided with studs projecting into guiding slots of the frame and fulcrumed to the frame at approximately their middle, means for restraining the forward movement of the link pintles, whereby the forward end of the shovel is elevated to cause the shovel to assume a rearwardly dumping angle.

5. In a loading device, the combination of a shovel, cheek-plates adjacent to the shovel, straight slotted apertures in the cheek plates, a pair of links pivoted at one end to the shovel and at the other end engaging said apertures in the cheek plates by a pair of pintles and adapted to support said shovel, levers fulcrumed to the cheek plates and pivoted to the link pintles moving in the slotted apertures, studs on the opposite ends of said levers, shoulders on the shovel adapted to engage the studs on the levers to reciprocate the links backwardly in the slotted apertures and lift the shovel to an angular position, causing the material to gravitate rearwardly, and a pivotally mounted chute resting with its free end in sliding contact with the shovel and receiving material discharged therefrom.

6. In a loading device, the combination of a gathering conveyer, a shovel, means having a straight, reciprocating action for imparting the several movements to the shovel, means for guiding the shovel comprising links supporting the shovel, guides for said links and levers controlling said links whereby said shovel will assume a movement first in the direction of penetrating the material and then in a lifting direction until it assumes a dumping angle, a chute pivotally mounted at one end of, and in delivery relation to the gathering conveyer, the free end of said chute adapted to sliding contact with and receiving its movements from the shovel in the various positions of said shovel.

7. In a loading apparatus, a conveyer, a shovel arranged to slide beneath and in advance of the conveyer, means for imparting reciprocating movement to the rear end of said shovel, cheek plates adjacent to the shovel, horizontal slotted apertures in the cheek plates, pintles on the shovel and links having their lower ends pivoted to the shovel pintles and the upper extremities of said links adapted to slide in the slotted apertures, levers fulcrumed to the cheek plates and pivoted at their upper extremities to the link pintles, shoulders on the shovel adapted to actuate said levers in coöperation with said links and said apertures, to force the shovel upwardly at the limit of its forward movement, dogs holding the upper ends of said levers, said dogs, said links and said reciprocating means causing the shovel to return in a different path from that assumed in its outward movement, a guide for conducting the material from the shovel to the conveyer adapted to rest in sliding connection with the shovel in the various positions of said shovel, means for operating the conveyer and reciprocating the shovel.

8. In a loading apparatus, a conveyer, a shovel arranged to slide beneath and in advance of the conveyer, guiding means comprising guide-ways and connections for the shovel, guiding the forward end of said shovel first straight forwardly, then upwardly at the limit of its forward movement and thereupon downwardly back to a horizontal position upon the rearward movement of the rear end of said shovel, said guiding means comprising guide-ways and connections between said guide-ways and the shovel, a guide for conducting the material from the shovel to the conveyer actuated by said shovel, and means for operating the conveyer and the shovel, said operating means actuating said shovel at its rear end.

9. In a loading apparatus, a conveyer, a reciprocating shovel, guiding means for guiding the shovel forwardly, tilting it upwardly, and causing it to move in an inclined position for a portion of its backward travel, said guiding means comprising guide-ways and connections between said guide-ways and the shovel, a chute pivotally mounted upon the conveyer and in sliding contact with the shovel, and means for operating the conveyer and the shovel, said operating means actuating said shovel at its rear end.

10. In a loading apparatus, a conveyer section, a shovel section connected thereto through means permitting tilting action of the shovel section relatively to said conveyer section; said shovel section comprising a shovel situated beneath the conveyer section when at rest, guiding means for guiding the shovel forward horizontally upwardly to an inclined position at the end of its forward horizontal travel and causing it to recede in such position for a portion of its backward travel, and a chute pivotally connected to the end of the conveyer section and riding in contact with the shovel; and means for operating the conveyer and the shovel, said operating means actuating said shovel at its rear end.

11. In a loading apparatus, a conveyer section, a shovel section connected thereto through means permitting tilting action of the shovel section relatively to said conveyer section; said shovel section comprising a shovel sliding beneath and in advance of the conveyer section, guiding means for guiding the shovel horizontally forward upwardly to an inclined position at the end of its horizontal forward travel and causing it to recede in such position then downwardly to its starting position beneath the conveyer, a chute pivoted to the conveyer and in sliding contact with the shovel; means for operating the conveyer, and means for operating the shovel, said last named means actuating the shovel at its rear end.

12. In a loading machine, the combination of a shovel, a link in which the shovel is swingingly mounted, a straight guide-way for the link and a thrust connection at the rear end of the shovel through which the shovel is caused to move with its link and which coöperates with said link and guideway to define the entire path through which the shovel moves, the end of the link where said shovel is mounted traversing a path leading first forward then upward, and rearward, to impart to the shovel first a horizontal and then a lifting movement.

13. In a loading device, the combination of a shovel, a member secured at the rear end thereof for operating said shovel, means supporting the shovel during its forward movement, and means actuated by said member and coöperating with said supporting means to raise and retract the forward end of the shovel while the rear end of the shovel continues to travel forward.

14. In a loading device, the combination of a shovel, links through which the shovel is swingingly mounted, bearings in which the links are supported permitting the links to move with the shovel, means imparting a thrust to the shovel, and means applied at the rear end of the shovel contacting with the shovel for retracting the supported ends of the links.

15. In a loading device, the combination of a shovel, links through which the shovel is swingingly supported, bearings in which the links are supported permitting the supported ends of the links to move with the shovel, means applied at the rear end of the shovel for imparting a thrust to the shovel, means contacting with said shovel, coöperating with said thrust imparting means for retracting the supported ends of the links.

16. In a loading device, the combination of a shovel, links by which the shovel is swingingly supported, slotted bearings in which the links are supported, permitting the supported ends of the links to move with the shovel, pivoted levers engaging the supported ends of the links and adapted to reverse the movement of the links in said slotted bearings, and means for imparting a thrust to the shovel which is also adapted to engage the pivoted levers at the completion of the outward travel of the shovel, and swing them in a direction to impart the return movement to the supported ends of the links.

17. In a loading device, the combination of a shovel, links supporting the shovel and having their supported ends movable with the shovel, means for imparting a thrust to the shovel, means for returning the supported ends of the links, and detents restraining the supported ends of the links to cause the shovel to return in a different path from that assumed in its outward movement.

18. In a loading device, the combination of a shovel, links supporting the shovel, bearings in which the links are supported, permitting their supported ends to move with the shovel, pivoted levers engaging the supported ends of the links, to return the links and raise the shovel, and detents engaging the levers after the return of the supported ends of the links to cause the shovel to return by a different path from that assumed in its outward movement.

19. In a loading device, the combination of a shovel, links supporting the shovel, bearings in which the pivoted ends of the links are supported, intermediately fulcrumed levers engaging the pivoted ends of the links and adapted to move the latter in opposition to the movement imparted by the shovel, means for imparting a thrust to the shovel that is also adapted to engage the pivoted levers and impart the return movement to the pivoted ends of the links, detents adapted to engage the said levers, to cause the shovel to return by a path different from that assumed in its outward thrust, and means carried by the links adapted to disengage the detents by the return movement of the links.

20. In a loading device, the combination of a conveyer, a shovel, means supporting the shovel and permitting it to move from a position beneath the end of the conveyer to a position forward thereof and then the forward end of said shovel to assume a position at a dumping angle above the conveyer with the rear end of said shovel remaining near the ground, and means applied at the rear end of said shovel for imparting movement to the shovel, said supporting means comprising a pair of links, guide-ways for the links, oscillating arms in connèction with said links and contacting with the shovel.

21. In a loading device, the combination of a conveyer, a shovel, swinging means for supporting the shovel and guiding it in its movements from a position beneath the conveyer to a position forward of the conveyer, other means coöperating with said swinging means for guiding the forward end of said shovel to a position above and in dumping relation to the conveyer, and a chute adapted to discharge upon the conveyer, pivoted in proximity thereto and having its free end resting upon, and actuated by the shovel, said guiding and supporting means comprising a pair of links, guide-ways for said links, oscillating arms in connection with said links and contacting with the shovel.

22. In a loading machine, the combination of a shovel, means guiding the shovel to cause it to assume a penetrating and shoveling movement, front and rear supporting bearings for the shovel defining the path through which said shovel moves, and means imparting the shoveling and penetrating movements to the shovel at the rear bearing comprising a thrust bar and automatically reversing reciprocating gear for driving said thrust bar.

The foregoing specification signed at Charleston, W. Va. this 20 day of March, 1909.

ROYDEN O. COUCH.

In presence of two witnesses:
W. A. CRACRAFT,
ELMER A. REED.

---

Copies of this patent may be obtained for five cents each, by addressing the "Commissioner of Patents, Washington, D. C."